United States Patent
Vanbuskirk et al.

(10) Patent No.: US 6,523,004 B1
(45) Date of Patent: Feb. 18, 2003

(54) METHOD AND APPARATUS FOR DISAMBIGUATING LISTS OF ELEMENTS FOR SPEECH INTERFACES

(75) Inventors: Ronald E. Vanbuskirk, Indiantown, FL (US); Keith P. Loring, Coral Springs, FL (US); Huifang Wang, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,144

(22) Filed: Jul. 19, 1999

(51) Int. Cl.[7] .............................................. G10L 15/04
(52) U.S. Cl. ...................... 704/251; 704/231; 704/270; 704/260; 704/275
(58) Field of Search ................................ 704/231, 251, 704/270, 272, 273, 275, 235, 260

(56) References Cited

U.S. PATENT DOCUMENTS

| | | | | |
|---|---|---|---|---|
| 5,493,606 A | * | 2/1996 | Osder et al. .................. 379/67 |
| 5,774,859 A | * | 6/1998 | Houser et al. ............... 704/275 |
| 5,774,860 A | * | 6/1998 | Bayya et al. ................ 704/275 |
| 5,920,836 A | * | 7/1999 | Gould et al. ................. 704/251 |
| 6,035,275 A | * | 3/2000 | Brode et al. ................. 704/275 |
| 6,073,097 A | * | 6/2000 | Gould et al. ................. 704/251 |
| 6,173,266 B1 | * | 2/2001 | Marx et al. .................. 704/270 |

OTHER PUBLICATIONS

Sarukkai et al., ("Phonetic set indexing for fast lexical access", IEEE Transactions on Pattern Analysis and Machine Intelligence, Jan. 1998, vol.20, issue 1, pp. 78–82), teach an indexing key for retrieving a short–list of word possibilities.*

* cited by examiner

*Primary Examiner*—Vijay Chawan
(74) *Attorney, Agent, or Firm*—Akerman Senterfitt

(57) ABSTRACT

In a computer system having a list based natural discourse application adapted for speech recognition. In response to a first user element request, the system searches a list of elements to generate a list of matches which contain elements which satisfy the element request. The system calculates the time required to read out the match list common levels, the time required to read out all matches, and the time required to iteratively query the user as to which matches of one of said common levels to read out. The system then reads out the match list using the method having the lowest calculated time.

32 Claims, 4 Drawing Sheets

METHOD AND APPARATUS FOR DISAMBIGUATING LISTS OF ELEMENTS FOR SPEECH INTERFACES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software and more particularly to list based natural discourse applications, wherein a user audibly selects an element from a list.

2. Description of the Related Art

Speech recognition software has a wide variety of uses. One important area where this technology has proved to be very useful is the conversion of spoken utterances into selection criteria for selecting an element from a list. List based natural discourse software provides a user with the ability to audibly select an element from a list of elements by uttering selection criteria into a microphone. In a speech-only interface (i.e. no other input, such as from a mouse or keyboard), this selection process can be extremely annoying to a user if it isn't handled properly. For example, long lists, or lists having a plurality of similar or ambiguous elements which meet the selection criteria, can take a long time or multiple iterations with the user to pare the list down to the desired element. Software developers often have to create specialized software code specific to the elements in a list to handle these situations.

SUMMARY OF THE INVENTION

The invention provides a method of selecting an element from a list of elements in a computer system having a list based natural discourse application adapted for speech recognition. In response to a first user element request, the system searches a list of elements to generate a list of matches which contain elements satisfying the element request criteria, and then chooses a preferred method of presenting the matches to a user.

In another aspect of the invention, the system determines the most probable matches, and if the number of matches selected for read out is less than a predetermined number, reads them out. If the number of most probable matches is not less than the predetermined number, the system reads out the number of matches in the list of matches, and then parses the matches into common levels based upon a predetermined criteria.

In yet another aspect of the present invention, the system calculates the time required to read out the match list common levels, the time required to read out all matches, and the time required to iteratively query the user as to which matches of one of the common levels to read out. The system then reads out the match list elements or levels using the method having the lowest calculated time.

In still another aspect of the invention, if the read out method selected selects a level in which the matches are to be read out, the system repeats the steps of the natural discourse application method beginning with calculating the time for each readout method using a revised list of matches containing only match list elements within the selected level until a match list element is selected by the user.

According to another aspect of the invention, if the calculated times are greater than a predetermined number, then after the times are calculated, the system queries the user to select one of the read out methods, and then reads out the matches using the read out method selected by the user. For the convenience of the user, if the user fails to select a read out method, then after the user has affirmatively declined to select a read out method, or fails to respond within a predetermined time, the system may select one of the read out methods based upon the number of match list common levels and the calculated read out times. The present invention accomplishes the general objective of disambiguating a list of elements for speech interfaces by efficiently paring the list down to the desired element.

According to yet another aspect, the invention may be embodied in a computer system having a list based natural discourse application adapted for speech recognition. In that case, the system includes application programming responsive to a first user element request for searching a list of elements to generate a list of matches which contain elements which satisfy the user element request, and then chooses a preferred method for presenting the matches to a user.

Finally, the invention may take the form of a machine readable storage having stored thereon a computer program having a plurality of code sections executable by a machine for causing the machine to perform a set of steps including: in response to a first user element request, searching a list of elements to generate a list of matches which contain elements which satisfy said element request; and choosing a preferred method for presenting the matches to a user.

These and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
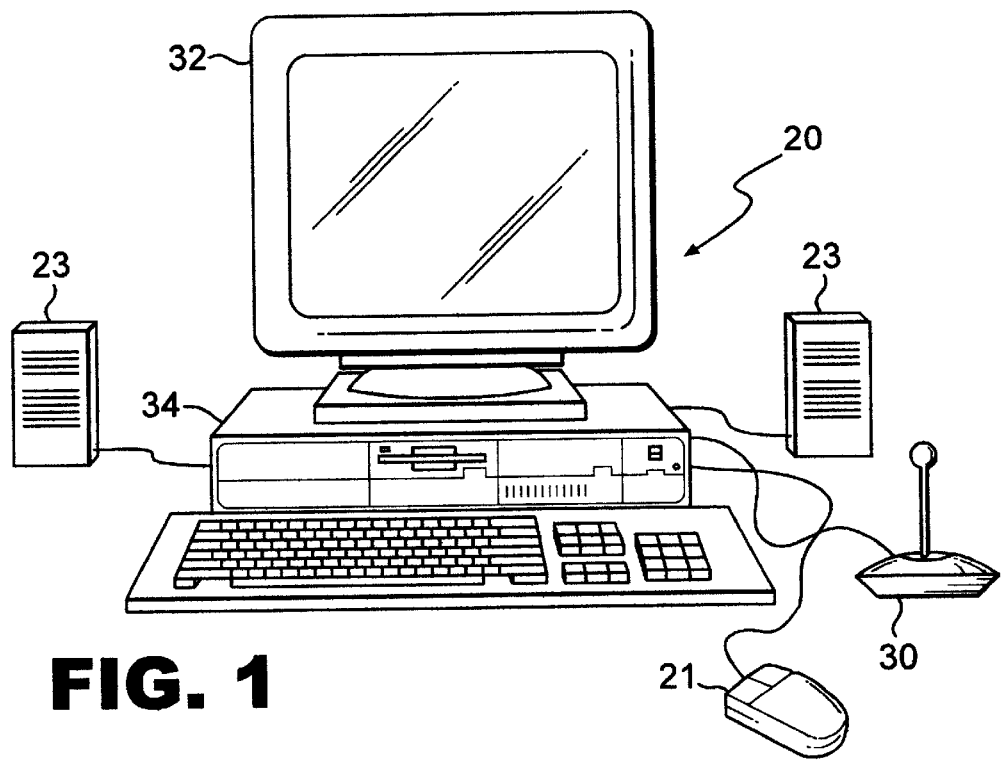
FIG. 1 is a block diagram which illustrates a computer system for speech recognition.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
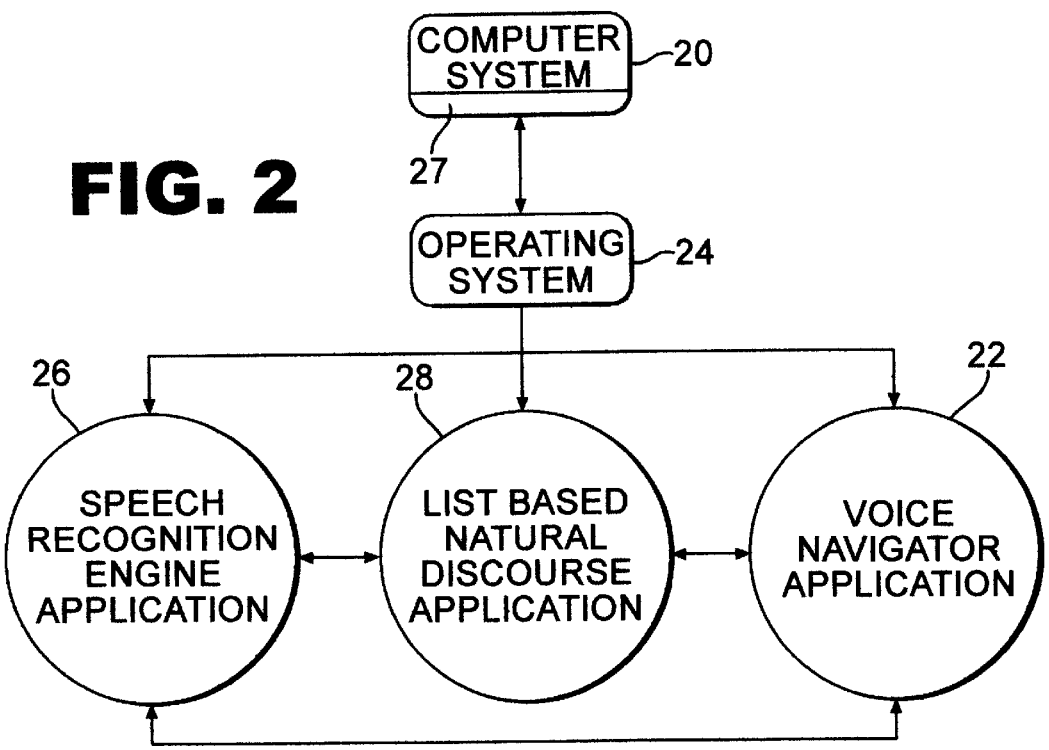
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A list based natural discourse application 28 and a voice navigator application 22 may also be provided. In FIG. 2, the speech recognition engine 26, list based natural discourse application 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the list based natural discourse and speech recognition engine, then the system may be modified to operate without the voice navigator application. The voice navigator primarily helps coordinate the operation of the speech recognition engine application. The list based natural discourse application provides a user with an ability to select an element from a list of elements by uttering an element request, such as keywords or words contained with the element, into the microphone 30. The selected element may then be used by other applications, or by the user for tasks not associated with the computer 20.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3A:
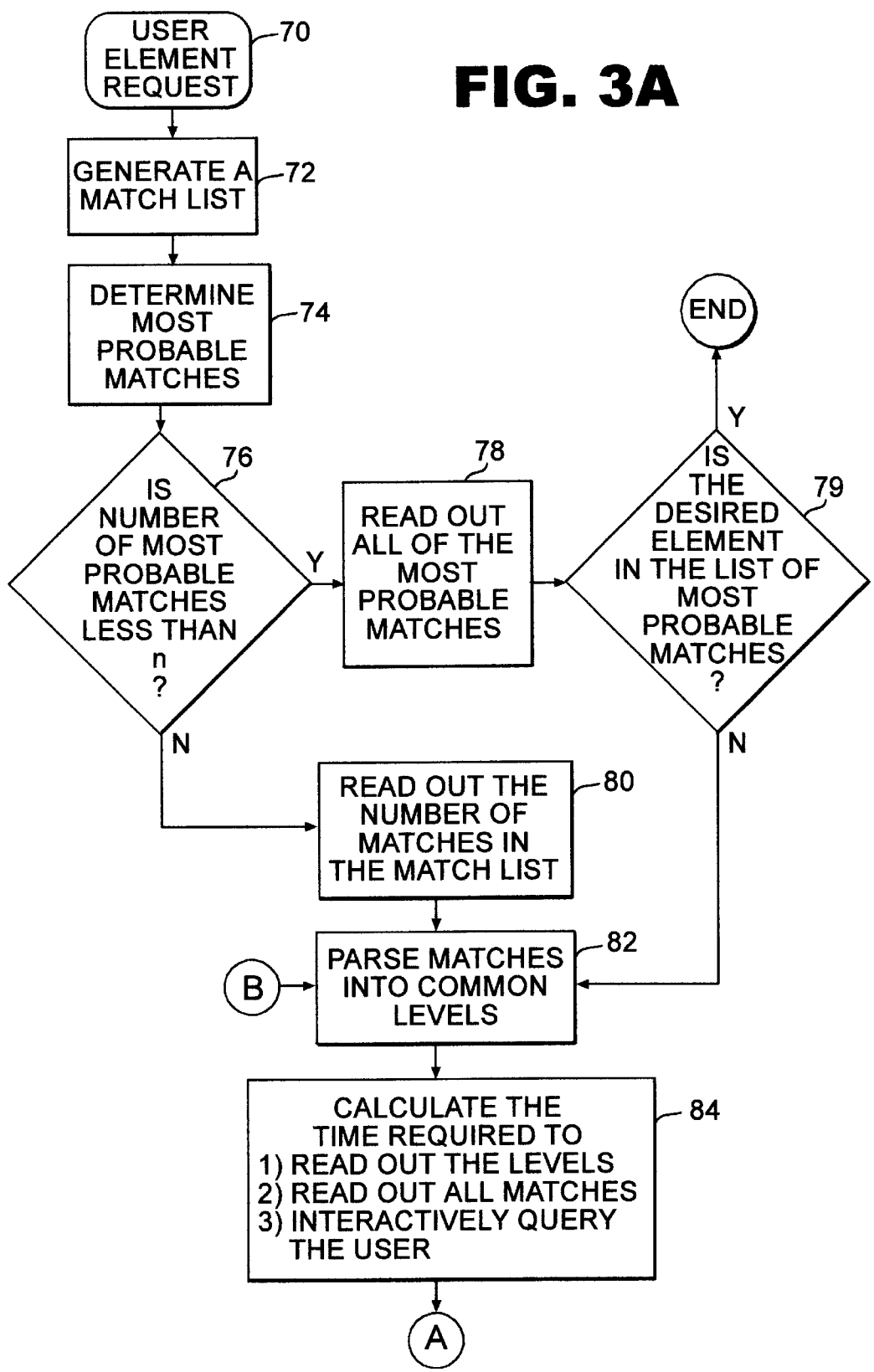
FIGS. 3A and 3B show a flow chart illustrating the process according to the present invention.
Figure 3B:
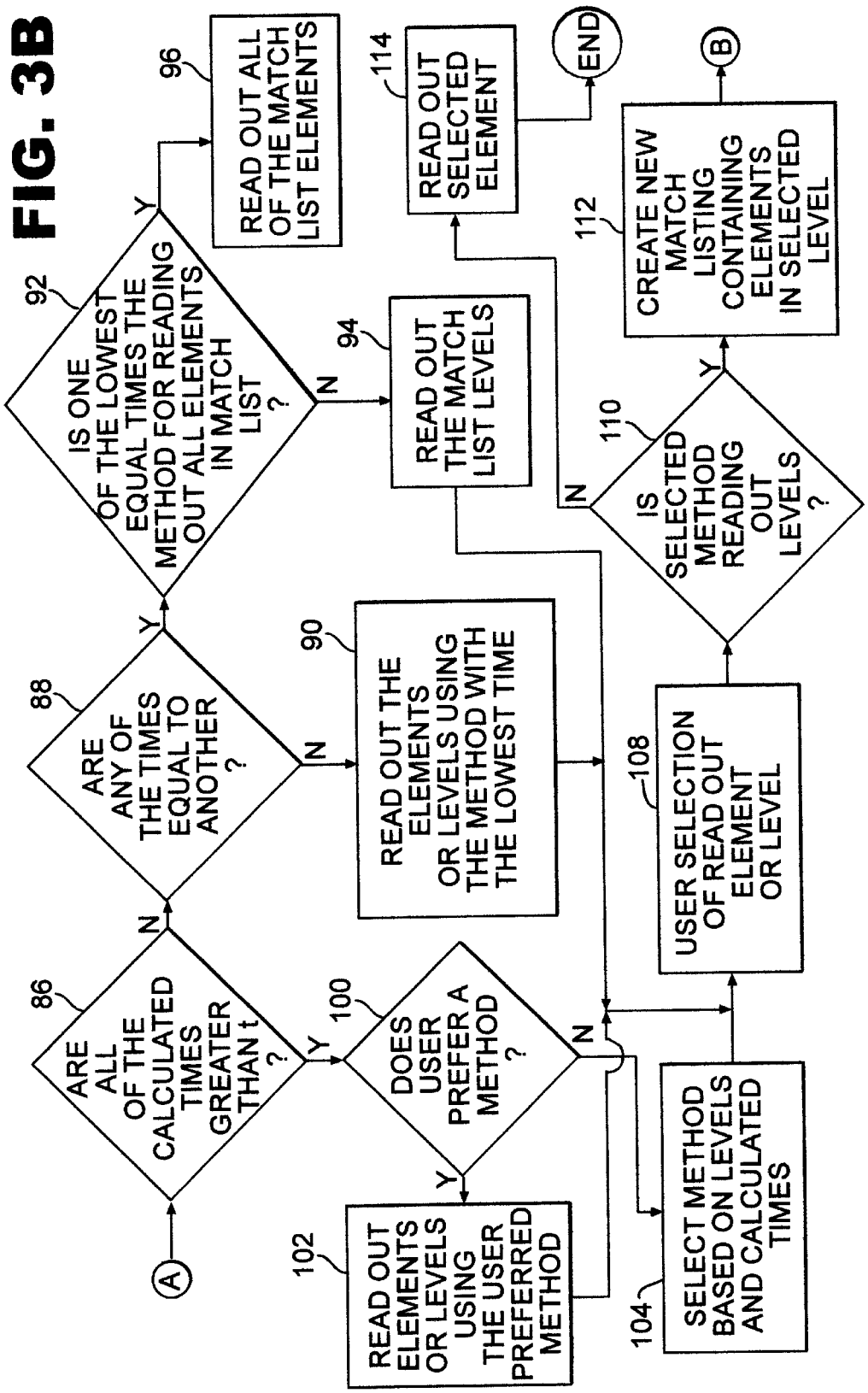

The words identified by the speech recognition engine 26 are digitally passed to the list based natural discourse application 28 as selection criteria for selecting an element from an element list. An element is a single item in a list of items. For example, in the following example, the element is a mutual fund in a list of mutual funds. FIGS. 3A and 3B illustrate the steps in a preferred embodiment of a list based natural discourse application incorporating the present invention. As shown in FIG. 3A, steps 70 and 72, the natural discourse application receives the search criteria, and then searches the element list to generate a match list of elements which meet the selection criteria.

For example, in a list based natural discourse application, in which a user selects a mutual fund from a list of mutual funds, the user utters a selection criteria, such as "Delaware Awareness" into the microphone. The application searches the element list and creates a match list consisting of all mutual funds having the words, "Delaware Awareness" in its title. Preferably, if the selection criteria has some missing information, such as additional words that are between or following the words in the selection criteria, the application includes elements containing the missing information in the match list.

As shown in FIG. 3A, steps 74, 76, and 78, the application minimizes the time necessary to select an element from the match list by providing the user with a short list of probable desired elements. The application creates the list of probable desired elements by determining if there is any information available that strongly points to a number of elements of the match list being more probable than other elements of the match list, such as the absence of missing information between words in the selection criteria. Once a list of most probable elements is created, the application reads out the list in step 78 through the speakers or on the display, and queries the user in step 79, as to whether one of the most probable matches is the desired element. If the desired element in the list of most probable matches, the application ends. If the desired element is not in the list of most probable elements, the application tells the user the number of total match elements in step 80, and proceeds to parse the match list into common levels in step 82.

Preferably, the list is only displayed if the number of most probable elements is less than a predetermined number, n, (e.g. 10), as in step 76 shown in FIG. 3A. If the number of probable match elements is greater than the predetermined number, the application tells the user the number of total match elements in step 80, and proceeds to parse the match list into common levels in step 82.

In step 82, the application parses the match list into common levels based upon predetermined criteria, such as the longest common substring, the first letter of the first word of the match, and the like, in order to generate branches of element matches. In the example, a match list, meeting the selection of criteria of "Delaware" may contain the following elements:

Delaware Social Awareness Equity A
Delaware Social Awareness Equity B
Delaware Social Awareness Equity C
Delaware Social Awareness Equity Y
Delaware Anti-social Awareness Equity A
Delaware Anti-social Awareness Equity B
Delaware Anti-social Awareness Equity C With the selection criteria of "Delaware", there are two primary levels ("Social Awareness Equity" and "Anti-social Awareness Equity"). Each of the primary levels can then be parsed into secondary levels (A, B, C, and Y) and (A, B, and C). In comparison, if the selection criteria is "Delaware Social," there is only one primary level containing four match elements (A, B, C, and Y).

In order to determine the most efficient method of reading out the match element list to the user, the application, shown in FIG. 3A, step 84, calculates the time required to read out the list using each of three different read out methods. The methods of reading out the match list elements include: reading out the match common levels; reading out all of the match list elements; and iteratively querying the user as to which common level match elements to read out. Thus in the above example, the application calculates the time to read out the two common levels "Social Awareness Equity," and "Anti-Social Awareness Equity"; the time to read out all seven elements; and the time to query the user as to which common level elements to read out. Of course, the calculated time for the method which iteratively queries the user as to which common level match elements to read out is dependent upon the time the user takes to respond to each query. Preferably, in calculating the time for the iterative query method, an average time to respond is used, such as determined in time studies which are well known in the art.

Looking particularly at FIG. 3B, steps 86, 88, and 90, once the time required to read out match list elements or levels is calculated, the application proceeds with the method having the lowest time. Preferably, as shown in FIG. 3B, steps 88, 92, 94, and 96, if one or more of the calculated times are equal, and if the time for reading out all of the match list elements is equal to the lowest time, the application reads out all of the match list elements, otherwise the application reads out the match list common levels for selection by the user for further paring. Most preferably, as shown in FIG. 3B, step 100, if all of the calculated times are greater than a predetermined time, t, the application queries the user as to a preferred read out method.

For the convenience of the user, shown in FIG. 3B, steps 100 and 104, if the calculated time is greater than a predetermined time, and the user fails to select a read out method, the application selects a read out method based upon the number of levels and the calculated time for each method. To determine an efficient read out method based upon the number of levels and the calculated time for each read out method the application preferably selects the read out method based upon rules, such as shown in FIG. 4.

Figure 4:
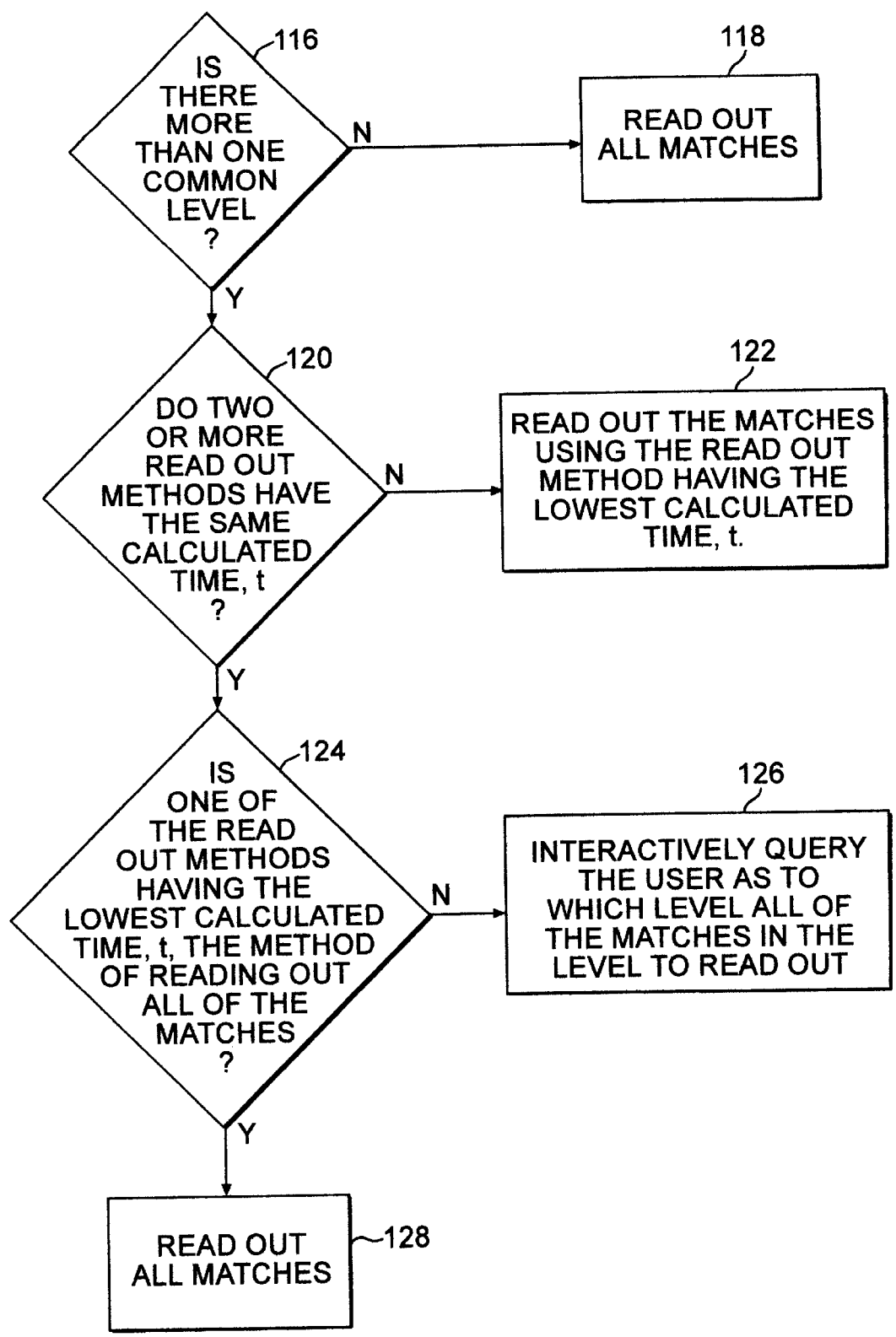
FIG. 4 shows a flowchart for selecting a read out method in a step of the process of FIGS. 3A and 3B.

Looking particularly at FIG. 4, steps 116, 118, 120, 122, 124, 126, and 128 select a read out method based upon the number of levels and the calculated time for each read out method the application. In step 1 1 6, the application determines whether there are more than one common level. If not, the application reads out all of the matches in step 118. If there is more than one common level, in step 120 the application determines whether two or more of the read out methods have the same calculated time, t. If not, the application reads out the matches using the read out method having the lowest time in step 122. If two or more of the read out methods have the same calculated time, the application, in step 124, determines whether one of the read out methods having the lowest time is the method of reading out all of the matches. If not, in step 126, the application iteratively queries the user as to which level all of the matches in the level to read out. If one of the read out methods having the lowest calculated time is reading out all of the matches, all of the matches are read out in step 128.

Once a read out method is selected, the application performs the selected method to read out the matched elements or common levels, and the user, in FIG. 3B, step 108, selects one of the read out levels or elements. As shown in FIG. 3B, steps 110 and 112, if the method selected includes reading out match list common levels either iteratively or in totality, once a common level is selected, the application repeats the process of parsing and calculating the read out times for each read out method using a match list consisting of only match list elements in the selected level. Preferably, when an element is finally selected, the selected element is read out, as in FIG. 3B, step 114, to confirm the selection.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer system having a list based natural discourse application adapted for speech recognition, a method of selecting a speech menu element from a list of elements comprising the steps of:

in response to a first user element request, searching a list of speech menu elements to generate a list of matches which contain elements which satisfy said element request;

determining a time required to play said matches for each of a plurality of audible playback methods; and choosing a preferred one of said plurality of audible playback methods for audibly presenting said matches to a user according to said determining step.

2. In a method of selecting an element from a list as claimed in claim 1, further comprising the steps of:

determining one or more most probable matches in said match list;

reading out said most probable matches.

3. In a method of selecting an element from a list as claimed in claim 2, wherein said most probable matches are read out if the number of matches selected for read out is less than a predetermined number.

4. In a method of selecting an element from a list as claimed in claim 2, wherein said most probable matches are matches having the least missing information.

5. In a method of selecting an element from a list as claimed in claim 1, said method further comprising:

parsing the matches in said list of matches into common levels based upon a predetermined criteria;

wherein said determining step comprises calculating the time required to read out the match list common levels, calculating the time required to read out all matches, calculating the time required to iteratively query the user as to which matches of one of said common levels to read out; and wherein said choosing step comprises reading out the match list using the method having the lowest calculated time.

6. In a method of selecting an element from a list as claimed in claim 5, further comprising the step:

If the read out method selected reads out a level in which the matches are to be read out, repeating the steps of the natural discourse application method beginning with the parsing step using a revised list of matches containing only match list elements within the selected level until a match list element is selected by the user.

7. In a method of selecting an element from a list as claimed in claim 5, wherein the calculated times are greater than a predetermined number, then after the times are calculated, querying the user to select one of said read out methods if all of the calculated times are greater than a predetermined time;

reading out the matches using the read out method selected by the user if the user selected one of said methods.

8. In a method of selecting an element from a list as claimed in claim 7, wherein the user fails to select a read out method, then after the user has affirmatively declined to select a read out method, or fails to respond within a predetermined time, selecting one of said read out methods based upon the number of match list common levels and the calculated read out times.

9. In a method of selecting an element from a list as claimed in claim 7, wherein the user fails to select a read out method, then after the user has affirmatively declined to select a read out method, or fails to respond within a predetermined time, reading out the matches using the read out method determined by the following criteria;
(1) if there is one common level, then read out all of the matches;
(2) if there are two or more common levels, then if two or more read out methods do not have the same calculated time, t, then read out the matches using the method having the lowest calculated time. If two or more of the methods of reading out the matches is equal to the lowest calculated time, and reading out all of the matches has one of the lowest calculated times, then read out all of the matches, otherwise iteratively query the user as to which level all of the matches in the level to read out.

10. In a method of selecting an element from a list as claimed in claim 5, wherein said predetermined criteria is length of a substring within said element.

11. In a method of selecting an element from a list as claimed in claim 5, wherein if one or more of the calculated times are equal, reading out all of the match list elements, if the time for reading out all of the match list elements is equal to the lowest time, otherwise reading out the match list common levels.

12. In a computer system having a list based natural discourse application adapted for speech recognition for selecting an element from a list comprising:

means responsive to a first user element request, searching a list of speech menu elements to generate a list of matches which contain speech menu elements which satisfy said element request;

means for determining a time required to play said matches for each of a plurality of audible playback methods; and means for choosing a preferred one of said plurality of audible playback methods for audibly presenting said matches to a user according to said time determination.

13. In a system as claimed in claim 12, further comprising:

means for determining one or more most probable matches in said list of matches;

means for reading out said most probable matches.

14. In a system as claimed in claim 13, wherein said most probable matches are read out if the number of matches selected for read out is less than a predetermined number.

15. In a system as claimed in claim 12, said system further comprising:

means for parsing the matches in said list of matches into common levels based upon a predetermined criteria;

wherein said means for determining a time comprise means for calculating the time required to read out the match list common levels, means for calculating the time required to read out all matches, means for calculating the time required to iteratively query the user as to which matches of one of said common levels to read out; and wherein said means for choosing comprise means for reading out the match list using the method having the lowest calculated time.

16. In a system as claimed in claim 15, further comprising:

means for querying the user to select one of said read out methods if all of the calculated times are greater than a predetermined time; and means for reading out the matches using the read out method selected by the user if the user selected one of said methods.

17. In a system as claimed in claim 16, further comprising: means for selecting one of said read out methods based upon the number of match list common levels and the calculated read out times if the user fails to select a read out method, and the user has affirmatively declined to select a read out method, or fails to respond within a predetermined time.

18. In a system as claimed in claim 16, wherein the user fails to select a read out method, then after the user has affirmatively declined to select a read out method, or fails to respond within a predetermined time, means for reading out the matches using the read out method determined by the following criteria;
(1) if there is one common level, then read out all of the matches;
(2) if there are two or more common levels, then if two or more read out methods do not have the same calculated time, t, then read out the matches using the method having the lowest calculated time. If two or more of the methods of reading out the matches is equal to the lowest calculated time, and reading out all of the matches has one of the lowest calculated times, then read out all of the matches, otherwise iteratively query the user as to which level all of the matches in the level to read out.

19. In a system as claimed in claim 15, wherein said predetermined criteria is length of a substring within said element.

20. In a system as claimed in claim 15, wherein in said means for reading out the match list using the method having the lowest calculated time, if one or more of the calculated times are equal, read out all of the match list elements, if the time for reading out all of the match list elements is equal to the lowest time, otherwise reading out the match list common levels.

21. In a system as claimed in claim 12, wherein said most probable matches are matches having the least missing information.

22. A machine readable storage, having stored thereon a computer program having a plurality of code sections executable by a machine for causing the machine to perform the steps of:

in response to a first user element request, searching a list of speech menu elements to generate a list of matches which contain elements which satisfy said element request;

determining a time required to play said matches for each of a plurality of audible playback methods; and choosing a preferred one of said plurality of audible playback methods for audibly presenting said matches to a user according to said determining step.

23. The machine readable storage as claimed in claim 22, further including a plurality of code sections executable by a machine for causing the machine to perform the step of:

determining one or more most probable matches in said match list;

reading out said most probable matches.

24. The machine readable storage as claimed in claim 23, wherein said most probable matches are read out if the number of matches selected for read out is less than a predetermined number.

25. The machine readable storage as claimed in claim 23, wherein choosing said preferred method includes the steps of:

parsing the matches in said list of matches into common levels based upon a predetermined criteria;

calculating the time required to read out the match list common levels;

calculating the time required to read out all matches;

calculating the time required to iteratively query the user as to which matches of one of said common levels to read out; and reading out the match list using the method having the lowest calculated time.

26. The machine readable storage as claimed in claim 25, further including a plurality of code sections executable by a machine for causing the machine to perform the step of:

If the read out method selected reads out a level in which the matches are to be read out, repeating the steps of the natural discourse application method beginning with the parsing step using a revised list of matches containing only match list elements within the selected level until a match list element is selected by the user.

27. The machine readable storage as claimed in claim 25, further including a plurality of code sections executable by a machine for causing the machine to perform said steps, wherein the calculated times are greater than a predetermined number, then after the times are calculated, querying the user to select one of said read out methods if all of the calculated times are greater than a predetermined time;

reading out the matches using the read out method selected by the user if the user selected one of said methods.

28. The machine readable storage as claimed in claim 27, further including a plurality of code sections executable by a machine for causing the machine to perform said steps, wherein the user fails to select a read out method, then after the user has affirmatively declined to select a read out method, or fails to respond within a predetermined time, selecting one of said read out methods based upon the number of match list common levels and the calculated read out times.

29. The machine readable storage as claimed in claim 27, further including a plurality of code sections executable by a machine for causing the machine to perform said steps, wherein the user fails to select a read out method, then after the user has affirmatively declined to select a read out method, or fails to respond within a predetermined time, reading out the matches using the read out method determined by the following criteria;

(1) if there is one common level, then read out all of the matches;

(2) if there are two or more common levels, then if two or more read out methods do not have the same calculated time, t, then read out the matches using the method having the lowest calculated time. If two or more of the methods of reading out the matches is equal to the lowest calculated time, and reading out all of the matches has one of the lowest calculated times, then read out all of the matches, otherwise iteratively query the user as to which level all of the matches in the level to read out.

30. The machine readable storage as claimed in claim 25, wherein said predetermined criteria is length of a substring within said element.

31. In the machine readable storage as claimed in claim 25, wherein, if one or more of the calculated times are equal, reading out all of the match list elements, if the time for reading out all of the match list elements is equal to the lowest time, otherwise reading out the match list common levels.

32. In the machine readable storage as claimed in claim 23, wherein said most probable matches are matches having the least missing information.

* * * * *